Oct. 28, 1930.  R. H. HAMBLY  1,779,733
WIRE TYING TOOL
Filed Nov. 21, 1929
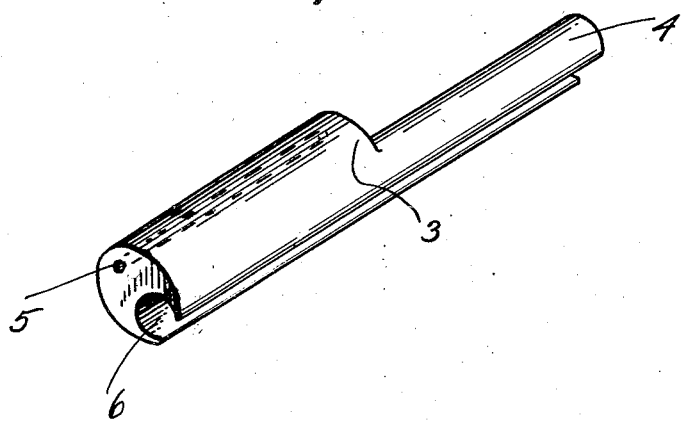
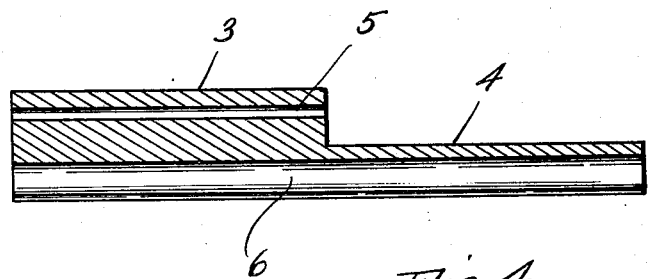
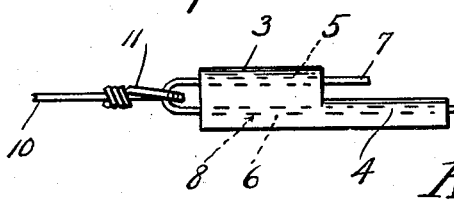
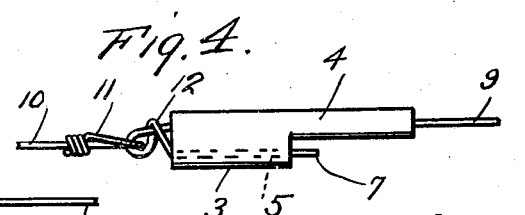
Inventor
Richard H. Hambly
By Clarence A. O'Brien
Attorney Patented Oct. 28, 1930

1,779,733

UNITED STATES PATENT OFFICE

RICHARD H. HAMBLY, OF COLCHESTER, ILLINOIS

WIRE-TYING TOOL

Application filed November 21, 1929. Serial No. 408,829.

This invention relates to a new tool generally referred to as a wire tie and constructed especially for wrapping or tying the ends of the wire together around a bale of hay.

At the present time the most common practice known to me for tying wire, especially around bales of hay comprises a hand method. This is usually tiresome and otherwise undesirable. For instance, in warm weather when the hands perspire and become soft, it is difficult to wrap the free end of the wire around the relatively stationary part of the wire for completing the tie. This method is likewise irritating in cold weather when the hands are stiff and difficult to manipulate. The result is that the fingers become unusually sore, cut, and rough.

In view of the foregoing makeshift methods of tying bale wire, I have evolved and produced a simple and economical metal tool which is especially designed to facilitate the tying of the wires and which serves to save time, is profitable, and otherwise efficient in fulfilling the requirements of an implement of this kind.

In the drawings:

Figure 1 is a perspective view of the tool constructed in accordance with the present invention, Figure 2 is a longitudinal sectional view thereof, Figure 3 is a relatively small elevational view showing the manner in which the device is associated with the adjacent end portion of a wire with the tool about to be rotated for twisting the bendable end portion, Figure 4 is a view like Figure 3 showing the bendable end twisted a single time.

In the drawing the device is shown as comprising a single metal casting including a substantially ovate body portion 3 which is approximately two inches in length and about one-half inch in width at its greatest point. This is provided at one end of the reduced portion defining an extension 4. Formed in the body 3 and opening through the opposite ends thereof is a longitudinal hole 5 through which the free end portion of the wire is passed.

The body and the extension are formed with a longitudinal groove 6 having a restricted neck or entrance portion through which the relatively stationary end portion 8 of the wire 9 is passed. The groove constitutes a keeper and permits the tool to be turned on the relatively stationary wire-end or fulcrum 8 for manipulation. Moreover it functions as a sleeve to allow the tool to be slipped along the wire lengthwise.

In the method of using the device illustrated in Figures 3 and 4 I have indicated the bendable extremity or terminal of the wire 9 by the numeral 7. This terminal is passed through the hole 5 in the body portion of the tool.

The adjacent fulcrum forming portion of the wire is designated at 8 and is located in the channel 6 as seen for example in Figure 3. Before passing the end 7 of the wire through the hole 5 it is inserted and passed through and bent around an eye 11 on the end of the opposite end portion 10 of the wire.

In baling hay these wires are sold in predetermined lengths and the eye 11 is a permanent portion of the wire.

By arranging the tool as seen in Figure 1 and giving it a turn as seen in Figure 4 the end portion 7 of the wire will be twisted around the fulcrum or wire-end 8 as indicated by the numeral 12. Any number of turns however may be imparted to the terminal 7 for wrapping it completely around the wire 9.

It will be seen that I have developed a simple and inexpensive tool which may be conveniently, expeditiously employed for tying the ends of the wire together especially in hay baling work. It is thought that persons skilled in the art to which this invention relates will be able to obtain a clear understanding after considering the description in connection with the drawings. Therefore a more lengthy description is regarded as unnecessary.

Minor changes in shape, size, materials, and rearrangement of features coming within the field of invention claimed may be resorted to in actual practice if desired.

Having thus described my invention, what I claim as new is:

As a new product of manufacture, a bale wire tying tool of the class described comprising a single casting including a relatively large body portion having a longitudinal hole extending therethrough for reception of the free end portion of a wire and provided at one end with an extension, said body and extension being formed with a longitudinal groove having an entrance slot and open at its opposite ends for reception of the relatively stationary portion of said wire.

In testimony whereof I affix my signature.

RICHARD H. HAMBLY.